(12) United States Patent
Shoji et al.

(10) Patent No.: US 12,174,406 B2
(45) Date of Patent: Dec. 24, 2024

(54) INFRARED SHIELDING FILM AND INFRARED SHIELDING MATERIAL

(71) Applicant: MITSUBISHI MATERIALS CORPORATION, Tokyo (JP)

(72) Inventors: Miho Shoji, Amagasaki (JP); Satoko Higano, Tokyo (JP); Hiroto Akaike, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 206 days.

(21) Appl. No.: 17/798,150

(22) PCT Filed: Jul. 30, 2020

(86) PCT No.: PCT/JP2020/029291
§ 371 (c)(1),
(2) Date: Aug. 8, 2022

(87) PCT Pub. No.: WO2021/166283
PCT Pub. Date: Aug. 26, 2021

(65) Prior Publication Data
US 2023/0081640 A1 Mar. 16, 2023

(30) Foreign Application Priority Data

Feb. 17, 2020 (JP) ................. 2020-024160

(51) Int. Cl.
G02B 5/20 (2006.01)
C01G 19/00 (2006.01)
(Continued)

(52) U.S. Cl.
CPC ............. G02B 5/208 (2013.01); C01G 19/00 (2013.01); C01G 19/02 (2013.01); C08J 5/18 (2013.01);
(Continued)

(58) Field of Classification Search
None
See application file for complete search history.

(56) References Cited

U.S. PATENT DOCUMENTS

2004/0251451 A1* 12/2004 Burgard .................... C09D 7/61
524/430
2006/0021548 A1* 2/2006 Lee .......................... C08K 3/01
106/400
(Continued)

FOREIGN PATENT DOCUMENTS

CN 101293645 A * 10/2008
CN 102653862 A * 9/2012
(Continued)

OTHER PUBLICATIONS

Machine Translation of JP-2000000927-A, Jan. 2000 (Year: 2000).*
(Continued)

Primary Examiner — Jeffrey A Vonch
(74) Attorney, Agent, or Firm — Locke Lord LLP; James E. Armstrong, IV; Nicholas J. DiCeglie, Jr.

(57) ABSTRACT

An infrared shielding film is an infrared shielding film including: an organic binder; and a plurality of tin-doped indium oxide particles (ITO particles) dispersed in the organic binder, in which the average center-to-center distance between adjacent particles of the ITO particles is in a range of 9 nm or more and 36 nm or less, the ratio of the average center-to-center distance between the adjacent particles to the average primary particle diameter of the ITO particles is in a range of 1.05 or more and 1.20 or less, and a roughness Ra of a film surface is in a range of 4 nm or more and 50 nm or less.

3 Claims, 1 Drawing Sheet

(51) Int. Cl.

| | |
|---|---|
| *C01G 19/02* | (2006.01) |
| *C08J 5/18* | (2006.01) |
| *C08K 3/22* | (2006.01) |
| *C09D 5/32* | (2006.01) |
| *C09D 7/61* | (2018.01) |
| *G02B 5/26* | (2006.01) |
| *B32B 5/16* | (2006.01) |
| *B32B 5/18* | (2006.01) |
| *B32B 17/10* | (2006.01) |
| *B32B 33/00* | (2006.01) |
| *C03C 17/00* | (2006.01) |

(52) U.S. Cl.
CPC .................. *C08K 3/22* (2013.01); *C09D 5/32* (2013.01); *C09D 7/61* (2018.01); *G02B 5/206* (2013.01); *G02B 5/26* (2013.01); *B32B 5/16* (2013.01); *B32B 17/10633* (2013.01); *B32B 33/00* (2013.01); *B32B 2260/025* (2013.01); *B32B 2260/046* (2013.01); *B32B 2305/30* (2013.01); *C01P 2004/64* (2013.01); *C01P 2006/60* (2013.01); *C03C 17/007* (2013.01); *C03C 2217/476* (2013.01); *C08J 2333/22* (2013.01); *C08K 2003/2231* (2013.01); *C08K 2201/011* (2013.01); *Y10T 428/24372* (2015.01); *Y10T 428/2438* (2015.01); *Y10T 428/25* (2015.01)

(56) References Cited

U.S. PATENT DOCUMENTS

| | | | | |
|---|---|---|---|---|
| 2007/0036985 | A1* | 2/2007 | Kamitani | C09D 4/00 427/372.2 |
| 2007/0178317 | A1* | 8/2007 | Kodaira | C03C 17/008 428/432 |
| 2007/0289493 | A1* | 12/2007 | Inoguchi | C03C 17/009 106/287.1 |
| 2008/0075936 | A1* | 3/2008 | McGurran | C08J 5/18 428/212 |
| 2009/0002809 | A1* | 1/2009 | Muromachi | C03C 17/009 359/350 |
| 2011/0036269 | A1* | 2/2011 | Hill | C01G 19/00 106/287.19 |
| 2013/0260139 | A1* | 10/2013 | Kamada | G02B 5/208 252/587 |
| 2014/0098414 | A1* | 4/2014 | Ohmori | B32B 17/10 359/359 |
| 2015/0285972 | A1 | 10/2015 | Hara et al. | |
| 2016/0011348 | A1* | 1/2016 | Hirakoso | G02B 5/208 359/359 |
| 2017/0145737 | A1 | 5/2017 | Hasegawa | |
| 2021/0179440 | A1* | 6/2021 | Higano | C01G 19/02 |
| 2021/0191016 | A1* | 6/2021 | Higano | C09D 7/67 |
| 2021/0276881 | A1* | 9/2021 | Higano | C01G 9/02 |

FOREIGN PATENT DOCUMENTS

| | | | | |
|---|---|---|---|---|
| CN | 103725077 A | * | 4/2014 | .............. G02B 1/10 |
| CN | 104428699 A | * | 3/2015 | ............ B32B 27/08 |
| CN | 104822522 A | | 8/2015 | |
| CN | 107076897 A | | 8/2017 | |
| CN | 107407753 A | | 11/2017 | |
| EP | 1842834 A1 | | 10/2007 | |
| JP | 07069632 A | * | 3/1995 | |
| JP | 08041441 A | * | 2/1996 | ............ C03C 17/23 |
| JP | H09-140275 A | | 6/1997 | |
| JP | 10265718 A | * | 10/1998 | |
| JP | 10286901 A | * | 10/1998 | |
| JP | 2000000927 A | * | 1/2000 | |
| JP | 2001332128 A | * | 11/2001 | |
| JP | 2006010759 A | * | 1/2006 | |
| JP | 2006245516 A | * | 9/2006 | |
| JP | 2007145712 A | * | 6/2007 | |
| JP | 2007269617 A | * | 10/2007 | |
| JP | 2009123396 A | * | 6/2009 | |
| JP | 2009288732 A | * | 12/2009 | |
| JP | 2011012233 A | * | 1/2011 | |
| JP | 2012126037 A | * | 7/2012 | |
| JP | 2012208169 A | * | 10/2012 | |
| JP | 2014044301 A | * | 3/2014 | |
| JP | 2016118679 A | * | 6/2016 | ....... B32B 17/10018 |
| JP | 2017170386 A | * | 9/2017 | |
| JP | 2019-066839 A | | 4/2019 | |
| KR | 804003 B1 | * | 2/2008 | .............. G03F 7/162 |
| KR | 2014132623 A | * | 11/2014 | .............. B22F 1/007 |
| TW | 201429711 A | * | 8/2014 | .............. C08J 7/047 |
| WO | WO-03083524 A1 | * | 10/2003 | .............. G02B 1/105 |
| WO | WO-2010131674 A1 | * | 11/2010 | ............ C01G 19/00 |
| WO | WO-2012132500 A1 | * | 10/2012 | ....... B32B 17/10633 |
| WO | WO-2012157655 A1 | * | 11/2012 | .............. B32B 17/10 |
| WO | WO-2013077252 A1 | * | 5/2013 | ....... B32B 17/10036 |
| WO | WO-2013146355 A1 | * | 10/2013 | ........... B32B 17/068 |
| WO | 2014/061279 A1 | | 4/2014 | |
| WO | WO-2014185518 A1 | * | 11/2014 | ......... B32B 17/1055 |
| WO | WO-2017208522 A1 | * | 12/2017 | .............. B01J 13/02 |
| WO | WO-2017217230 A1 | * | 12/2017 | ....... B32B 17/10036 |
| WO | WO-2018143076 A1 | * | 8/2018 | ............ C01G 15/00 |
| WO | WO-2019065788 A1 | * | 4/2019 | ............ B32B 27/30 |

OTHER PUBLICATIONS

Machine Translation of JP-2001332128-A, Nov. 2001 (Year: 2001).*
Office Action mailed Jun. 2, 2023, issued for CN202080096657.6 and English translation thereof.
International Search Report mailed Sep. 24, 2020, issued for PCT/JP2020/029291 and English translation thereof.
Office Action mailed Jul. 31, 2023, issued for TW109125941 and English translation of the Search Report.
Supplementary European Search Report mailed Jan. 5, 2024, issued for European Patent Application No. 20920163.1.

* cited by examiner

INFRARED SHIELDING FILM AND INFRARED SHIELDING MATERIAL

TECHNICAL FIELD

The present invention relates to an infrared shielding film, and an infrared shielding material having this infrared shielding film.

Priority is claimed on Japanese Patent Application No. 2020-024160, filed Feb. 17, 2020, the content of which is incorporated herein by reference.

BACKGROUND ART

A transparent body such as window glass used in automobiles and buildings generally easily transmits infrared rays which are heat sources. For this reason, in automobiles and buildings, it is being examined to dispose an infrared shielding material on a transparent body to shield infrared rays in light with which the transparent body is irradiated, thereby reducing the temperature rise inside the automobiles or buildings and the cooling load associated with this temperature rise.

As an infrared shielding film, an infrared shielding film containing agglomerated particles in which a plurality of single core shell particles having an ITO particle as a core agglomerate, and a binder cured substance binding the above-mentioned agglomerated particles to each other is known (Patent Document 1).

CITATION LIST

Patent Document

[Patent Document 1]
  Japanese Unexamined Patent Application, First Publication No. 2019-066839 (A)

SUMMARY OF INVENTION

Technical Problem

In the infrared shielding film disclosed in Patent Document 1, since the core shell particles form the agglomerated particles, a predetermined space is formed between ITO particles, which are cores, by shells. When this space is formed, the electric field of the surface plasmons of the ITO particles which are generated by excitation by infrared rays is enhanced by a near-field effect. Therefore, the infrared shielding film disclosed in Patent Document 1 can efficiently reflect incident infrared rays by the resonance of the surface plasmon of the ITO particles.

Meanwhile, an infrared shielding film used for window glass used in automobiles and buildings preferably has excellent transmittance of visible light. However, in the infrared shielding film disclosed in Patent Document 1, visible light is scattered due to a difference in the refractive indices between the agglomerated particles of the core shell particles and the binder cured substance. Therefore, the haze tends to be high, and the visible light transmittance tends to be low.

The present invention has been made in view of the above-mentioned circumstances, and an objective of the present invention is to provide an infrared shielding film and an infrared shielding material which have low haze and high reflectance with respect to infrared rays.

Solution to Problem

In order to achieve the above-mentioned objective, an infrared shielding film of one aspect of the present invention (hereinafter referred to as "infrared shielding film of the present invention") is an infrared shielding film including: an organic binder; and a plurality of tin-doped indium oxide particles (ITO particles) dispersed in the organic binder, in which the average center-to-center distance between adjacent particles of the ITO particles is in a range of 9 nm or more and 36 nm or less, the ratio of the average center-to-center distance between the adjacent particles to the average primary particle diameter of the tin-doped indium oxide particles is in a range of 1.05 or more and 1.20 or less, and a roughness Ra of a film surface is in a range of 4 nm or more and 50 nm or less.

According to the infrared shielding film of the present invention, the reflectance with respect to infrared rays is high since the ITO particles are dispersed with spaces therebetween such that the average center-to-center distance between the adjacent ITO particles is in the range of 9 nm or more and 36 nm or less, and the ratio of the average center-to-center distance between the adjacent ITO particles to the average primary particle diameter of the ITO particles is in the range of 1.05 or more and 1.20 or less. In addition, since the roughness Ra of the film surface is 4 nm or more and a large number of the ITO particles are dispersed in the vicinity of the film surface, the reflectance to infrared rays is high. In addition, since the roughness Ra of the film surface is 50 nm or less, scattering of visible light on the film surface is less likely to occur, which makes the haze low.

Here, in the infrared shielding film of the present invention, the average primary particle diameter of the above-mentioned ITO particles is preferably in a range of 8 nm or more and 30 nm or less.

In this case, since the average primary particle diameter of the ITO particles is in the above-mentioned range and fine, scattering of visible light is less likely to occur, which makes the haze of the infrared shielding film lower. In addition, since surface plasmons are easily generated on the surface of the ITO particles, the reflectance of the infrared shielding film with respect to infrared rays is further improved.

An infrared shielding material of another aspect of the present invention (hereinafter referred to as "infrared shielding material of the present invention") has the above-mentioned infrared shielding film.

According to the infrared shielding material of the present invention, since the above-mentioned infrared shielding film is provided, the haze can be lowered, and the reflectance with respect to infrared rays is high.

Advantageous Effects of Invention

According to the present invention, an infrared shielding film and an infrared shielding material which have low haze and high reflectance with respect to infrared rays can be provided.

DESCRIPTION OF EMBODIMENTS

Figure 1:
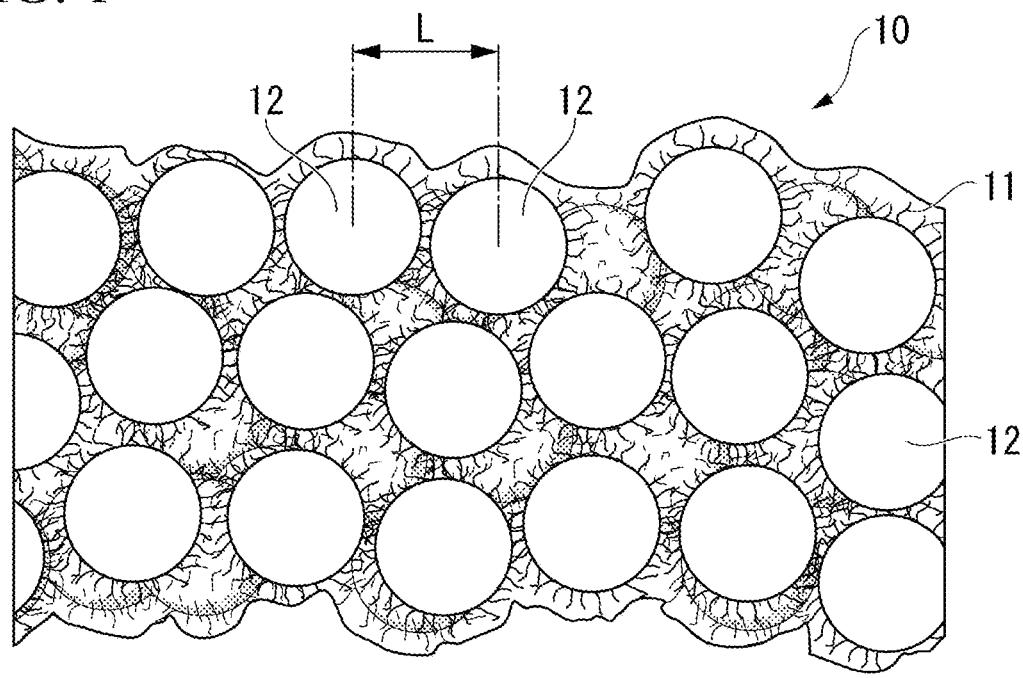
FIG. 1 is a schematic cross-sectional diagram of an infrared shielding film according to one embodiment of the present invention.

Hereinafter, embodiments of the present invention will be described with reference to the accompanying drawings.
<Infrared Shielding Film>
FIG. 1 is a schematic cross-sectional diagram of an infrared shielding film according to one embodiment of the present invention.

As shown in FIG. 1, an infrared shielding film 10 is constituted of an organic binder 11, and a plurality of ITO particles 12 dispersed in the organic binder 11. The ITO particles 12 are mainly dispersed in the state of primary particles.

The organic binder 11 is preferably an organic compound having a group having an affinity for the ITO particles 12. The organic binder 11 is preferably in contact with the ITO particles 12 via the group having an affinity. The ITO particles 12 are preferably coated with the organic binder 11. By being coated with the organic binder 11, the inter-particle distance of the ITO particles 12 is likely to be a constant space. Examples of the group having an affinity for the ITO particle 12 include a nitrile group (—CN) and an ester group (—CO—OR'). IV of the ester group represents a hydrogen atom, an alkyl group having the number of carbon atoms in the range of 1 to 20, an aryl group having the number of carbon atoms in the range of 6 to 20, and an aralkyl group having the number of carbon atoms in the range of 7 to 20. The group having an affinity for the ITO particles 12 is preferably a nitrile group.

The organic binder 11 is preferably a hydrocarbon compound having a group having an affinity for the ITO particles 12 at the terminal. The hydrocarbon compound may be an unsaturated hydrocarbon compound or may be a saturated hydrocarbon compound. In addition, the hydrocarbon compound may be a chain hydrocarbon compound or may be a cyclic hydrocarbon compound. As the chain hydrocarbon compound, alkanes ($C_nH_{2n+2}$), alkenes ($C_nH_{2n}$), and alkynes ($C_nH_{2n-2}$) can be used. As the cyclic hydrocarbon compound, cycloalkanes ($C_nH_{2n}$), cycloalkenes ($C_nH_{2n-2}$), cycloalkynes ($C_nH_{2n-4}$), and aromatic hydrocarbon compounds (benzene, naphthalene) can be used. The number of carbon atoms of the hydrocarbon compound is preferably in a range of 8 to 20. The hydrocarbon compound is preferably an alkane or an alkene.

The boiling point of the organic binder 11 is preferably 120° C. or higher.

Examples of the organic binder 11 having a nitrile group include (Z)-4-octenenitrile, (Z)-5-octenenitrile, (Z)-5-nonenenitrile, (Z)-6-undecenenitrile, (Z)-9-undecenenitrile, (Z)-9-octadecenenitrile, (Z)-9-decenenitrile, (Z)-9-decenenitrile, (Z) dodecenenitrile, (Z)-2-tridecenenitrile, (Z)-9-tetradecenenitrile, (Z)-2-pentadecenenitrile, (E)-8-heptadecenenitrile, (Z)-9-hexadecenenitrile, (Z)-11-nonadecenenitrile, (Z) eicosenenitrile, octanenitrile, nonanenitrile, decanenitrile, undecanenitrile, dodecylnitrile, tridecylnitrile, tetradecylnitrile, pentadecylnitrile, hexadecylnitrile, heptadecylnitrile, octadecanenitrile, nonadecanenitrile, and eicosanenitrile. Examples of the organic binder 11 having an ester group include octanoic acid, octylic acid, nonanoic acid, decanoic acid, dodecanoic acid, tetradecanoic acid, palmitic acid, and stearic acid. As the organic binder 11, one kind may be used alone, or two or more kinds may be used in combination.

The ITO particles 12 are dispersed such that the average center-to-center distance between adjacent ITO particles is in the range of 9 nm or more and 36 nm or less. As shown in FIG. 1, the average center-to-center distance is the average of a distance L between the center of an ITO particle 12 to be measured and the center of an ITO particle 12 located closest to the ITO particle 12. The distance L between the ITO particles can be measured using an enlarged photograph (an enlarged image of an observed image (such that 50 or more particles are contained in one visual field) of the cross-section of the infrared shielding film 10 using an electron scanning microscope (magnification: 200,000 to 400,000 times) of the cross-section of the infrared shielding film 10 (a cross-sectional photograph taken by using an ion milling device (IM4000PLUS or ArBlade 5000 (registered trademark) manufactured by Hitachi High-Tech Corporation)). The average distance L is the average distance between the ITO particles measured for the 50 ITO particles 12.

Regarding the ITO particles 12, a ratio Y/X of the average center-to-center distance Y between adjacent ITO particles to the average primary particle diameter X is in the range of 1.05 or more and 1.20 or less. By dispersing the ITO particles 12 such that the average center-to-center distance between adjacent ITO particles and the ratio Y/X are in the above-mentioned ranges, the electric field of the surface plasmons generated by exciting the ITO particles 12 with infrared rays is enhanced by a near-field effect. Therefore, the infrared reflectance of the infrared shielding film 10 becomes high. In a case where the average center-to-center distance between adjacent ITO particles is less than 9 nm or the ratio Y/X is less than 1.05, the space between the ITO particles 12 becomes too narrow, the electric field of the surface plasmons is less likely to be enhanced, and there is a risk of a decrease of the infrared reflectance of the infrared shielding film 10. In addition, in a case where the space between the ITO particles 12 is too narrow, the roughness Ra of the surface of the infrared shielding film 10 tends to be too large. On the other hand, in a case where the average center-to-center distance between adjacent ITO particles exceeds 36 nm or the ratio Y/X exceeds 1.20, the space between the ITO particles 12 becomes too wide, the surface plasmons are less likely to be generated, and there is a risk of a decrease of the infrared reflectance of the infrared shielding film 10. In addition, in a case where the space between the ITO particles 12 is too wide, the roughness Ra of the surface of the infrared shielding film 10 tends to be too small.

Although not particularly limited, the upper limit value of the above-mentioned ratio Y/X may be 1.15 or less. In addition, the average center-to-center distance between adjacent ITO particles may be 34.5 nm or less.

The average primary particle diameter of the ITO particles 12 is preferably in a range of 8 nm or more and 30 nm or less. In a case where the average primary particle diameter of the ITO particles 12 is in the above-mentioned range, the dispersibility of the ITO particles 12 is high, which makes it possible to uniformly disperse the ITO particles 12 in the organic binder 11. Therefore, the infrared reflectance of the infrared shielding film 10 is further improved.

Although not particularly limited, the average primary particle diameter of the ITO particles 12 may be in the range of 10 nm or more and 25 nm or less. In this case, the average center-to-center distance between the ITO particles is preferably 10.5 nm or more and 30 nm or less.

In the infrared shielding film 10, the roughness Ra of the film surface is in the range of 4 nm or more and 50 nm or less. The roughness Ra of the film surface is the average value of the roughness Ra of surfaces on both sides in a case where the infrared shielding film 10 is a free-standing film. In a case where the infrared shielding film 10 is deposited on a substrate, the roughness Ra of the film surface is the roughness Ra of the film surface on the opposite side to the substrate side. The roughness Ra of the film surface can be reduced by reducing the amount of the ITO particles 12 on the film surface side of the infrared shielding film 10. In a case where the roughness Ra of the film surface is less than 4 nm, the amount of the ITO particles 12 is too small, the surface plasmons are less likely to be generated, and there is a risk of a decrease of the infrared reflectance of the infrared shielding film 10. On the other hand, in a case where the roughness Ra of the film surface exceeds 50 nm, the amount of the ITO particles 12 is too large, and there is a risk that the haze is likely to be generated.

Although not particularly limited, the roughness Ra of the film surface of the infrared shielding film 10 may be in the range of 5 nm or more and 40 nm or less.

The roughness Ra of the film surface of the infrared shielding film 10 can be obtained by analyzing a cut surface image of the above-mentioned film using image analysis software, extracting a surface roughness line of the surface on the opposite side to a glass substrate of the film, performing image analysis on the obtained surface roughness line using image processing software, and calculating the sum of the average value of absolute values of the mountain height from the highest mountain peak to the fifth mountain of the surface roughness line, and the average value of absolute values of the fifth valley bottom from the lowest valley bottom.

The content ratio of the organic binder 11 and the ITO particles 12 of the infrared shielding film 10 is not particularly limited, but it is preferable that the amount of the organic binder 11 be an amount in the range of 5 parts by mass or more and 30 parts by mass or less when the ITO particles 12 are 100 parts by mass.

Next, a method of depositing the infrared shielding film of the present embodiment will be described.

The infrared shielding film of the present embodiment can be deposited by preparing a coating liquid containing ITO particles with an organic binder, and then coating a substrate with the obtained coating liquid and drying it, for example.

The ITO particles can be produced using a method of heating fatty acid salts of In and fatty acid salts of Sn in the presence of an organic solvent while stirring to cause the fatty acid salts of In and the fatty acid salts of Sn to react with each other, for example. Since the surface of the ITO particles, which are produced using the fatty acid salts of In and the fatty acid salts of Sn, is coated with an organic protective group derived from the fatty acid salts, it is difficult to form agglomerated particles. Therefore, an infrared shielding film in which the ITO particles are dispersed in the state of primary particles is easily obtained.

The fatty acid of the fatty acid salts of In and the fatty acid salts of Sn is preferably a saturated fatty acid. The fatty acid is preferably a linear fatty acid or a branched fatty acid. The number of carbon atoms of the fatty acid is preferably in a range of 5 to 18. Examples of the fatty acid salts include hexanoic acid, octanoic acid, decanoic acid, palmitic acid, stearic acid, neodecanoic acid, and 2-ethylhexanoic acid. The fatty acid salts of In and the fatty acid salts of Sn may be salts of the same fatty acids or may be salts of different fatty acids.

The organic solvent is preferably a hydrocarbon compound. The hydrocarbon compound may be an unsaturated hydrocarbon compound or may be a saturated hydrocarbon compound. In addition, the hydrocarbon compound may be a chain hydrocarbon compound or may be a cyclic hydrocarbon compound. The number of carbon atoms of the hydrocarbon compound is preferably in a range of 5 to 22. As the organic solvent, n-octyl ether, octadecene, n-trioctylamine, and dodecylamine can be used, for example.

The temperature when heating the fatty acid salts of In and the fatty acid salts of Sn is in the range of 200° C. or higher and 350° C. or lower, for example. In addition, the heating time is in the range of 0.5 hours or more and 8 hours or less, for example.

The ITO particles with the organic binder can be produced by mixing ITO particles and an organic binder in an organic solvent to generate the ITO particles with the organic binder, and then recovering the ITO particles with the organic binder in the organic solvent.

The organic solvent is not particularly limited, but alcohols and ketones are preferably used. Examples of the alcohols include methanol, ethanol, 1-butanol, 2-butanol, hexanol, 2-propanol, ethylene glycol monoethyl ether, ethylene glycol monomethyl ether, methoxyethanol, propylene glycol, and diethylene glycol. Examples of the ketones include acetone, methyl ethyl ketone (MEK), and methyl isobutyl ketone (MIBK). For these organic solvents, one kind may be used alone, or two or more kinds may be used in combination.

The blending ratio of the amount of the organic binder and the ITO particles is a ratio such that the amount of the organic binder is in the range of 5 parts by mass or more and 30 parts by mass or less with respect to 100 parts by mass of the ITO particles. It is preferable to use the organic binder and the ITO particles with sufficient stirring.

As a method of recovering the ITO particles with the organic binder in the organic solvent, a known solid-liquid separation method such as decantation or filtration can be used.

The coating liquid can be prepared by injecting the recovered ITO particles with the organic binder into an organic solvent for the coating liquid, and dispersing.

As the organic solvent for the coating liquid, alcohols, ketones, glycol ethers, glycol ether acetates, and hydrocarbon compounds can be used.

Examples of the alcohols include methanol, ethanol, propanol, and isopropyl alcohol (IPA). Examples of the ketones include acetone, methyl ethyl ketone (MEK), and methyl isobutyl ketone (MIBK). Examples of the glycol ethers include ethylene glycol monomethyl ether, diethylene glycol monomethyl ether, propylene glycol monomethyl ether, dipropylene glycol monomethyl ether, ethylene glycol monoethyl ether, diethylene glycol monoethyl ether, propylene glycol monoethyl ether, and dipropylene glycol monoethyl ether. Examples of the glycol ether acetates include ethylene glycol monomethyl ether acetate, diethylene glycol monomethyl ether acetate, propylene glycol monomethyl ether acetate, dipropylene glycol monomethyl ether acetate, ethylene glycol monoethyl ether acetate, diethylene glycol monoethyl ether acetate, propylene glycol monoethyl ether acetate, and dipropylene glycol monoethyl ether acetate. Examples of the hydrocarbon compounds include cyclic hydrocarbon compounds such as benzene, toluene, ethylbenzene, p-xylene, cyclopropane, and cyclohexane, and chain hydrocarbon compounds such as n-pentane, n-hexane, n-heptane, n-octane, n-tetradecane, n-hexadecane, and n-octadecane. For these organic solvents, one kind may be used alone, or two or more kinds may be used in combination. The organic solvent is preferably a low-polarity organic solvent such as hydrocarbon compounds, or a mixed solvent containing a low-polarity organic solvent and a high-polarity organic solvent such as alcohols. In the case of the mixed solvent, the blending ratio of the low-polarity organic solvent and the high-polarity organic solvent is preferably in a range of the mass ratio of 99:1 to 90:10 (former:latter).

In the coating liquid, the ITO particles are preferably dispersed in the organic solvent in the state of primary particles or close to the primary particles. The average particle diameter of the ITO particles in the coating liquid measured by a dynamic light scattering particle size analyzer is preferably 1.3 times or less and more preferably 1.2 times or less the average primary particle diameter of the ITO particles. In a case where the average particle diameter of the ITO particles in the coating liquid is too long, there is a risk that the roughness Ra of the film surface of the obtained infrared shielding film is too large.

As a method of applying the coating liquid prepared as described above to a substrate, a general coating method such as a slot die coater, a spin coater, an applicator, and a bar coater can be used, for example.

The drying temperature at the time of drying the coating liquid with which the substrate is coated may be any temperature as long as the organic solvent of the coating liquid volatilizes, and is in the range of 40° C. or higher and 120° C. or lower, for example. The drying time varies depending on the drying temperature, but is usually in the range of 5 minutes or more and 120 minutes or less.

<Infrared Shielding Material>

Figure 2:
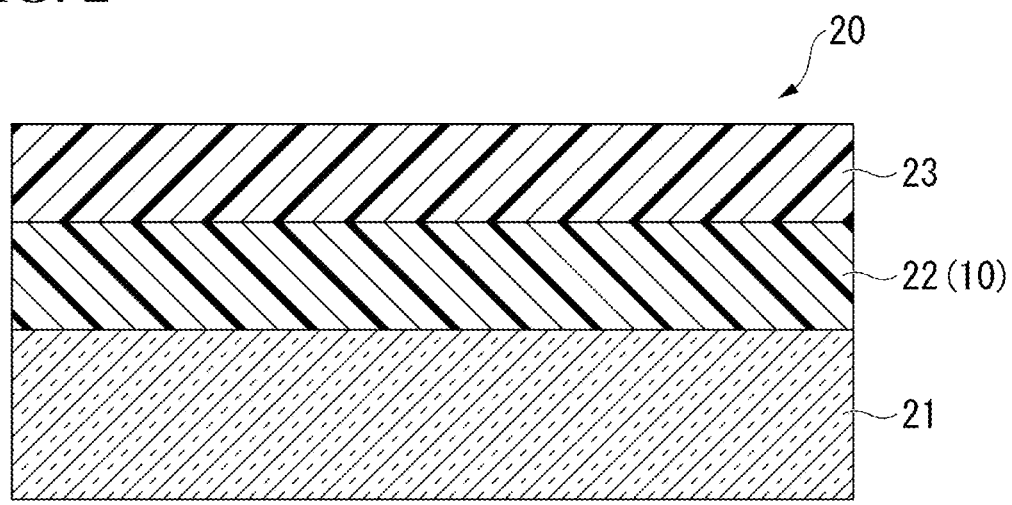
FIG. 2 is a schematic cross-sectional diagram of an infrared shielding material according to one embodiment of the present invention.

FIG. 2 is a schematic cross-sectional diagram of an infrared shielding material according to one embodiment of the present invention.

As shown in FIG. 2, an infrared shielding material 20 includes a substrate 21, an infrared shielding layer 22, and an overcoat layer 23. The overcoat layer 23 may be provided as needed, and is not necessarily required.

Examples of the material of the substrate 21 include glass and glass substitute resin. Examples of the glass substitute resin include polycarbonate resin and acrylic resin. The shape of the substrate 21 is not particularly limited, and may be any shape such as a plate shape, a sheet shape, and a film shape.

The infrared shielding layer 22 is a layer that reflects infrared rays. The infrared shielding layer 22 is the above-mentioned infrared shielding film 10.

The overcoat layer 23 has a function of protecting the infrared shielding layer 22 to improve chemical resistance and abrasion resistance. As the material of the overcoat layer 23, glass or resin can be used, for example. As the resin, a polycarbonate resin, an acrylic resin, an epoxy resin, and a polyvinyl acetal resin can be used.

The thickness of the overcoat layer 23 is preferably in a range of 1 μm or more and 5 μm or less. When the thickness of the overcoat layer 23 is 1 μm or more, chemical resistance is improved. Meanwhile, when the thickness of the overcoat layer 23 is 5 μm or less, a decrease of the transmission rate of visible light is suppressed.

According to the infrared shielding film 10 of the present embodiment having the above configuration, the reflectance with respect to infrared rays is high since the ITO particles 12 are dispersed with spaces therebetween such that the average center-to-center distance between the adjacent ITO particles is in the range of 9 nm or more and 36 nm or less, and the ratio of the average center-to-center distance between the adjacent ITO particles to the average primary particle diameter of the ITO particles 12 is in the range of 1.05 or more and 1.20 or less. In addition, since the roughness Ra of the film surface is 4 nm or more and a large number of the ITO particles 12 are dispersed in the vicinity of the film surface, the reflectance to infrared rays is high. In addition, since the roughness Ra of the film surface is 50 nm or less, scattering of visible light on the film surface is less likely to occur, which makes the haze of the infrared shielding film 10 low.

In addition, in the infrared shielding film 10 of the present embodiment, in a case where the average primary particle diameter of the ITO particles 12 in the range of 8 nm or more and 30 nm or less, which is fine, scattering of visible light is less likely to occur, which makes the haze of the infrared shielding film 10 lower. In addition, since surface plasmons are easily generated on the surface of the ITO particles, the reflectance of the infrared shielding film 10 with respect to infrared rays is further improved.

According to the infrared shielding material 20 of the present embodiment, the infrared shielding layer 22 is the above-mentioned infrared shielding film 10. Therefore, the infrared shielding material 20 of the present embodiment has low haze, and high reflectance with respect to infrared rays.

Although the embodiments of the present invention have been described above, the present invention is not limited thereto and can be appropriately changed in the range not departing from the technical idea of the invention.

EXAMPLES

Hereinafter, the action and effect of the present invention will be described using examples.

Present Invention Example 1

Indium octanoate was prepared as an In source, and tin octanoate was prepared as an Sn source.

Injection to a glass container was performed such that a blending amount was 9.0 parts by mass in terms of In amount for the indium octanoate, 1.0 part by mass in terms of Sn amount for the tin octanoate, and 90 parts by mass for 1-octadecene, and mixing was performed. The obtained mixture was heated to 300° C. in a nitrogen atmosphere with being stirred, and this temperature was maintained for 3 hours to generate ITO particles in which the particle surface was modified with an organic protective group.

The generated ITO particles were recovered by decantation. The recovered ITO particles were cleaned several times using ethanol.

The ITO particles after cleaning were dispersed in ethanol to form a slurry. (Z)-9-Octadecenenitrile as an organic binder was added to the obtained slurry in an amount of 5 parts by mass with respect to 100 parts by mass of the ITO particles in the slurry, and stirring was performed. Thereafter, ITO particles with (Z)-9-octadecenenitrile having the surface on which (Z)-9-octadecenenitrile was adsorbed were recovered by filtration.

An organic solvent containing 1-butanol and toluene in the mass ratio of 5:95 (former:latter) was prepared. The ITO particles with (Z)-9-octadecenenitrile were dispersed in this organic solvent to obtain a coating liquid (dispersion liquid of the ITO particles with (Z)-9-octadecenenitrile). The concentration of solid contents in the coating liquid was 10% by mass.

0.2 mL of the obtained coating liquid was added dropwise onto a glass substrate (size: length 50 mm×width 50 mm×thickness 0.7 mm) to perform coating by spin coating under the condition of a rotation speed of 2000 rpm. Subsequently, the glass substrate was heated at 120° C. and dried to deposit an ITO particle film on the glass substrate.

Present Invention Examples 2 to 10 and Comparative Examples 1 to 3

A coating liquid was prepared in the same manner as in Present Invention Example 1 except that as the In source and Sn source, fatty acid salts described in Table 1 below were blended in blending ratios described in Table 1 below to produce ITO particles, and that as the organic binder, compounds described in Table 1 below were added in ratio amounts described in Table 1 below with respect to 100 parts by mass of the ITO particles. In Comparative Example 1, an organic binder was not used. Then, using the obtained coating liquid, an ITO particle film was deposited on a glass substrate in the same manner as in Present Invention Example 1.

[Evaluation]

(1) Average Particle Diameter of ITO Particles in Coating Liquid

An organic solvent containing 1-butanol and toluene in the mass ratio of 5:95 (former:latter) was added to the coating liquid and diluted to prepare a sample in which the concentration of solid contents was 1% by mass. Subsequently, the particle size distribution of the ITO particles in the obtained sample in terms of volume was measured using a dynamic light scattering particle size analyzer (Zetasizer Nano ZSP manufactured by Malvern Panalytical Ltd.), and the average particle diameter of the ITO particles was calculated. The results are shown in Table 1 below together with materials used to prepare the ITO particle dispersion liquid.

(2) Average Primary Particle Diameter X of ITO Particles

The ITO particle film was peeled off from the glass substrate. The peeled ITO particle film was injected to an organic solvent containing 1-butanol and toluene in the mass ratio of 5:95 (former:latter), and ultrasonic dispersion treatment was performed to disperse the ITO particles in the ITO particle film. The ITO particles dispersed in the solvent were recovered, and an enlarged image of the recovered ITO particles was taken using a transmission electron microscope. The obtained enlarged image was subjected to image analysis using image processing software (ImageJ) to measure the Feret diameters of 10,000 ITO particles, and the average value thereof was defined as the average primary particle diameter X of the ITO particles. The results are shown in Table 2 below.

(3) Average Inter-Particle Distance Y Between ITO Particles

For the cut surface image obtained in (4) below, the center-to-center distance between adjacent ITO particles was measured for 50 ITO particles using image processing software (ImageJ), and the average value thereof was calculated. The results are shown in Table 2 below together with the ratio (Y/X) of the average inter-particle distance Y between the adjacent ITO particles to the average primary particle diameter X of the ITO particles.

(4) Roughness Ra of Film Surface

A resin-embedded ITO particle film was cut in a direction perpendicular to the film surface, and the cut surface was mirror-polished. Next, the cut surface was imaged using an electron scanning microscope (SU8000 manufactured by Hitachi High-Technologies Corporation). For the obtained cut surface image, a surface roughness line of the surface on the opposite side to the glass substrate of the ITO particle film was extracted using image analysis software (Thermo Scientific, Avizo software). Image analysis was performed on the obtained surface roughness line using image processing software (ImageJ), and the sum of the average value of absolute values of the mountain height from the highest mountain peak to the fifth mountain of the surface roughness line, and the average value of absolute values of the fifth valley bottom from the lowest valley bottom was calculated and defined as the roughness Ra. The results are shown in Table 2 below.

(5) Haze

The haze of the ITO particle film deposited on the glass substrate was measured according to a method specified in JIS K 7136:2000 (Plastics—Determination of Haze for Transparent Materials). As a measurement device, a Haze Meter HZ-2 (manufactured by Suga Test Instruments Co., Ltd.) was used. The results are shown in Table 2 below.

(6) Infrared Reflectance

The surface of the ITO particle film deposited on the glass substrate was irradiated with infrared rays in the wavelength range of 800 to 2500 nm, and the maximum reflectance of these infrared rays was measured using a spectrophotometer (Hitachi High-Technologies Corporation, product name U-4100). The results are shown in Table 2 below.

TABLE 1

| | Raw material of ITO particle | | | | | | Average particle diameter of ITO particles in coating liquid (nm) |
|---|---|---|---|---|---|---|---|
| | In source | | Sn source | | Organic binder | | |
| | Type | Blending ratio Note 1) | Type | Blending ratio Note 1) | Type | Blending amount Note 2) | |
| Present Invention Example 1 | Indium octanoate | 9.0 | Tin octanoate | 1.0 | (Z)-9-Octadecenenitrile | 5 | 11 |
| Present Invention Example 2 | Indium octanoate | 9.5 | Tin octanoate | 0.5 | (Z)-6-Undecenenitrile | 10 | 16 |
| Present Invention Example 3 | Indium 2-ethylhexanoate | 9.0 | Tin 2-ethylhexanoate | 1.0 | (Z)-5-Nonenenitrile | 5 | 13 |
| Present Invention Example 4 | Indium neodecanoate | 9.2 | Tin neodecanoate | 0.8 | (Z)-9-Undecenenitrile | 15 | 19 |
| Present Invention Example 5 | Indium stearate | 8.8 | Tin stearate | 1.2 | (Z)-4-Octenenitrile | 30 | 21 |
| Present Invention Example 6 | Indium hexanoate | 9.0 | Tin hexanoate | 1.0 | (Z)-9-Octadecenenitrile | 10 | 9 |
| Present Invention Example 7 | Indium octanoate | 8.8 | Tin 2-ethylhexanoate | 1.2 | (Z)-5-Nonenenitrile | 20 | 10 |
| Present Invention Example 8 | Indium palmitate | 9.5 | Tin palmitate | 0.5 | (Z)-5-Octenenitrile | 20 | 32 |
| Present Invention Example 9 | Indium decanoate | 9.2 | Tin decanoate | 0.8 | (Z)-4-Octenenitrile | 15 | 20 |
| Present Invention Example 10 | Indium stearate | 9.0 | Tin palmitate | 1.0 | (Z)-5-Octenenitrile | 20 | 26 |

TABLE 1-continued

| | Raw material of ITO particle | | | | | | Average particle diameter of ITO particles in coating liquid (nm) |
|---|---|---|---|---|---|---|---|
| | In source | | Sn source | | Organic binder | | |
| | Type | Blending ratio Note 1) | Type | Blending ratio Note 1) | Type | Blending amount Note 2) | |
| Comparative Example 1 | Indium octanoate | 9.0 | Tin octanoate | 1.0 | — | — | 80 |
| Comparative Example 2 | Indium octanoate | 8.8 | Tin octanoate | 1.2 | (Z)-6-Undecenenitrile | 0.5 | 50 |
| Comparative Example 3 | Indium neodecanoate | 9.0 | Tin decanoate | 1.0 | (Z)-9-Octadecenenitrile | 100 | 15 |

Note 1)
Blending ratio when the total amount of an In source and an Sn source is 10

Note 2)
Blending amount when ITO particles are 100 parts by mass

TABLE 2

| | Average primary particle diameter X of ITO particles (nm) | Average center-to-center distance Y between ITO particles (nm) | Y/X | Roughness Ra of film surface (nm) | Haze (%) | Infrared region maximum reflectance (%) |
|---|---|---|---|---|---|---|
| Present Invention Example 1 | 10.4 | 11 | 1.06 | 14 | 0.10 | 56 |
| Present Invention Example 2 | 15.2 | 17 | 1.12 | 21 | 0.24 | 54 |
| Present Invention Example 3 | 12.4 | 13 | 1.05 | 18 | 0.15 | 49 |
| Present Invention Example 4 | 18.4 | 21 | 1.14 | 20 | 0.16 | 60 |
| Present Invention Example 5 | 19.6 | 22 | 1.12 | 35 | 0.32 | 45 |
| Present Invention Example 6 | 8.0 | 9 | 1.13 | 4 | 0.11 | 50 |
| Present Invention Example 7 | 9.6 | 11 | 1.15 | 8 | 0.18 | 48 |
| Present Invention Example 8 | 30 | 36 | 1.20 | 50 | 0.35 | 59 |
| Present Invention Example 9 | 19.6 | 21 | 1.07 | 15 | 0.15 | 58 |
| Present Invention Example 10 | 24.6 | 27 | 1.10 | 30 | 0.23 | 61 |
| Comparative Example 1 | 15.4 | 15 | 0.97 | 65 | 30.2 | 19 |
| Comparative Example 2 | 18.4 | 19 | 1.03 | 80 | 20.4 | 25 |
| Comparative Example 3 | 14.6 | 38 | 2.60 | 3 | 0.12 | 4.9 |

It was found that the ITO particle films of Present Invention Examples 1 to 10, in which the average center-to-center distance between the ITO particles was in the range of 9 nm or more and 36 nm or less, the ratio Y/X of the average center-to-center distance Y between adjacent ITO particles to the average primary particle diameter X of the ITO particles was in the range of 1.05 or more and 1.20 or less, and the roughness Ra of the film surface was in the range of 4 nm or more and 50 nm or less, are useful as infrared shielding films since the haze was 0.35% or less in the all present invention examples, which was low, and the infrared region maximum reflectance was 45% or more, which was high.

On the other hand, the infrared region maximum reflectance was low in the ITO particle films of Comparative Examples 1 and 2 in which the average center-to-center distance between the ITO particles was in the range of the present invention but the ratio Y/X was less than 1.05. This is because the space between the ITO particles was too narrow, which made the electric field of the surface plasmons difficult to be enhanced. In addition, the ITO particle films of Comparative Examples 1 and 2 had high haze. This is because the roughness Ra of the film surface exceeded 50 nm.

In addition, the infrared region maximum reflectance was lower in the ITO particle film of Comparative Example 3 in which the average center-to-center distance exceeded 36 nm, the ratio of Y/X exceeded 1.20 or less, and the roughness Ra of the film surface was less than 4 nm. This is because the space between the ITO particles was too wide, which made the surface plasmons difficult to be generated.

INDUSTRIAL APPLICABILITY

The infrared shielding film and the infrared shielding material of the present invention can be advantageously applied to applications requiring high visible light transmittance and infrared shielding properties, such as window glass used in automobiles and buildings.

REFERENCE SIGNS LIST

10: Infrared shielding film
11: Organic binder
12: ITO particle
20: Infrared shielding material
21: Substrate
22: Infrared shielding layer
23: Overcoat layer

What is claimed is:

1. An infrared shielding film comprising:
an organic binder; and
a plurality of tin-doped indium oxide particles dispersed in the organic binder,
wherein the tin-doped indium oxide particles are produced using fatty acid salts of In and fatty acid salts of Sn, and surfaces of the tin-doped indium oxide particles are coated with an organic protective group derived from the fatty acid salts,
the organic binder is one selected from the group consisting of (Z)-4-octenenitrile, (Z)-5-octenenitrile, (Z)-5-nonenenitrile, (Z)-6-undecenenitrile, (Z)-9-undecenenitrile, and (Z)-9-octadecenenitrile,
an amount of the organic binder is in a range of 5 parts by mass or more and 30 parts by mass or less when an amount of the tin-doped indium oxide particles is 100 parts by mass,
the tin-doped indium oxide particles are dispersed in a state of primary particles,
an average center-to-center distance between adjacent particles of the tin-doped indium oxide particles is in a range of 9 nm or more and 36 nm or less,
a ratio of the average center-to-center distance between the adjacent particles to an average primary particle diameter of the tin-doped indium oxide particles is in a range of 1.05 or more and 1.20 or less, and
a roughness Ra of a film surface is in a range of 4 nm or more and 50 nm or less.

2. The infrared shielding film according to claim 1, wherein the average primary particle diameter of the tin-doped indium oxide particles is in a range of 8 nm or more and 30 nm or less.

3. An infrared shielding material comprising the infrared shielding film according to claim 1.

* * * * *